US006470412B1

(12) United States Patent
Kisaka et al.

(10) Patent No.: US 6,470,412 B1
(45) Date of Patent: Oct. 22, 2002

(54) DISK DRIVE, DISK CONTROL METHOD, DATA READ/WRITE METHOD, DATA ASSIGNMENT METHOD, AND DISK STORAGE MEDIUM

(75) Inventors: Masashi Kisaka, Yokohama; Yutaka Ozawa, Fujisawa; Kazunari Tsuchimoto, Sagamihara, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/169,549

(22) Filed: Oct. 9, 1998

(30) Foreign Application Priority Data

Oct. 9, 1997 (JP) .............................................. 9-277096

(51) Int. Cl.[7] .............................................. G06F 12/00
(52) U.S. Cl. .............................. 711/4; 711/112; 360/22; 360/72.1; 360/78.04; 360/78.08
(58) Field of Search .......................... 711/4, 111, 112; 360/22, 78.04, 78.08, 72.1

(56) References Cited

U.S. PATENT DOCUMENTS

| | | | | |
|---|---|---|---|---|
| 4,727,439 A | * | 2/1988 | Haruna et al. ................ | 360/49 |
| 5,245,594 A | * | 9/1993 | Shimizu ...................... | 369/32 |
| 5,428,802 A | | 6/1995 | Anglin et al. | |
| 5,784,220 A | * | 7/1998 | Nishimura et al. ......... | 360/78.14 |
| 6,034,837 A | * | 3/2000 | Purkett ........................ | 360/78 |
| 6,343,351 B1 | * | 1/2002 | Lackman et al. ........... | 711/158 |

FOREIGN PATENT DOCUMENTS

| | | |
|---|---|---|
| JP | 56-87204 | 7/1981 |
| JP | 7-134872 | 5/1995 |

OTHER PUBLICATIONS

B.H. Berger et al., "Handling Defective Tracks in a Cached Environment", IBM Technical Disclosure Bulletin, vol. 29, No. 5, pp. 2116–2117.

M.T. Benhase et al., "Handling Defective Tracks in a Cached Storage System", IBM Technical Disclosure Bulletin, vol. 25, No. 7B, pp. 3758–3759.

A. Ganguly et al., "Increased Direct–Access Storage Device Yield Through Defective Track Handling in Hardware", IBM Technical Disclosure Bulletin, vol. 24, No. 1B, pp. 625–627.

* cited by examiner

*Primary Examiner*—Matthew Kim
*Assistant Examiner*—Matthew D. Anderson
(74) *Attorney, Agent, or Firm*—Abdy Raissinia; Bracewell & Patterson, L.L.P.

(57) ABSTRACT

A disk drive and a disk drive control method is described which reduces the number of one track seeks a drive performs. The one track seeks can operate the actuator bearing in a non-linear mode or can increase in the friction of the actuator bearing which leads to servo positioning inaccuracies. In the disk drive the logical block address (LBA) assignments are made so that when sequential addresses are allocated to two different tracks, the tracks are physically non-adjacent. Thus, when a sequential LBAs are read across a track boundary, the actuator is moved farther than would be required if the LBAs were assigned the adjacent tracks.

18 Claims, 5 Drawing Sheets

Track Format

LBA Assignment

Track Change With Single Surface

Track Change With Multiple Surfaces

DISK DRIVE, DISK CONTROL METHOD, DATA READ/WRITE METHOD, DATA ASSIGNMENT METHOD, AND DISK STORAGE MEDIUM

BACKGROUND OF THE INVENTION

1. Field of the Invention

The present invention relates to a disk drive, a disk control method, a data read/write method, a data assignment method and a disk storage medium used in a hard disk drive (HDD) or the like.

2. Description of Related Art

In a disk drive drive, if data cannot be read/written from/into a physical sector normally, this sector is recognized as a defective sector and registered in a defect map. For example, a disk drive unit having a capacity of 2 GB is provided with a memory which contains a storage region corresponding to 2000 defective sectors in the form of a defect map.

Defective sectors are detected during manufacture or during a low level formatting of a magnetic disk. During a logical formatting, logical block addresses (LBAs) are allocated to physical sectors which are not registered in the defect map. The LBAs are used in communications with the host. The commands from the host will specify a sector by an LBA. Each disk drive has means to map LBAs to actual physical sectors essentially without regard to the LBA. Among other things this allows defective sectors to be in effect mapped out of use by not being assigned an LBA. The physical location of the sector is unknown to the host. Another consequence of LBA mapping is that sector 1 on one drive design might be mapped to a physical sector in a track near the center of the data area while in another drive sector 1 might be mapped to a track near the edge of the data area. In regard to defective sectors which are produced during the use of the disk drive unit, since LBAs have already been respectively allocated to these defective sectors by the logical formatting, these defective sectors are registered in the defect map and these LBAs are respectively allocated to substitutive sectors.

In general, a magnetic disk has a plurality of concentric, circular data tracks. Reading/writing from/into the magnetic disk is executed subsequent to a seek, namely, rotating the magnetic disk and moving a magnetic head substantially radially over the magnetic disk to position it at a particular data track.

The positioning of the magnetic head at the particular data track is performed by reading head position identification information and a servo burst pattern which are previously recorded on the magnetic disk.

FIG. 5 and FIG. 6 are diagrams illustrating track formats used in conventional hard disk drive units. FIG. 5 shows a track change on a single surface of the magnetic disk while FIG. 6 shows a cylinder change as a track change on a plurality of surfaces (or multiple surfaces) of the stack of magnetic disks.

Further, FIG. 5 shows concentric and circular data tracks n, n+1, n+2, . . . formed on the magnetic disk, and illustrates the track change occurring when the data recorded on the track n+1 follows the data recorded on the track n.

Furthermore, FIG. 6 shows concentric and circular data tracks n, n+1, . . . formed on each of disk surfaces, and illustrates the head change and the cylinder change as the track change occurring when the data recorded on the track n of the surface 2 follows the data recorded on the track n of the surface 1 and when the data recorded on the track n+1 of the surface 1 follows the data recorded on the track n of the surface 2. Data access by the head change is performed electrically without the seek, and hence the head change is performed more quickly. FIG. 6 also shows a case that the head change from the surface 1 to the surface 2 takes place first and is then followed by the cylinder change.

As has been described above, in any of the track changes on the single surface or the multiple surfaces, when the sequential data is accessed in sequence, a series of one-track seeks may take place in succession.

SUMMARY OF THE INVENTION

A disk drive according to the present invention includes a disk storage medium having concentric and circular tracks; and seek control means for controlling a seek in which a magnetic head is brought radially over the disk storage medium to be positioned on one of the tracks. The seek control means controls the seek in such a way that, when reading/writing sequential data from/into two of the tracks by radially moving the magnetic head, a distance between the two of the tracks is equal to or greater than twice as long as a track interval, i.e., moving to a track other than an adjacent track. The seek control means preferably assigns LBAs so that where a sequence of LBAs spans two tracks, the two tracks are not adjacent tracks.

A disk control method according to the present invention is the method for controlling a seek in which a magnetic head is brought radially over a disk storage medium having concentric and circular tracks to be positioned on one of the tracks. The method includes the steps of detecting an event at which a track change takes place; and controlling the seek in such a way that, when the track change between two of the tracks takes place, a distance between the two of the tracks is equal to or greater than twice as long as a track interval.

In the above-mentioned detecting step, a judgement may be made whether or not the sequential data is read/written from/into the last data sector among data sectors within the track. Further, a judgement may be made whether or not the sequential data is read/written from/into an innermost track or an outermost track.

In the above-mentioned seek controlling step, the seek maybe controlled so as to seek every other track from/into which the sequential data is read/written. Further, the seek may be controlled so as to initially seek in sequence even-numbered tracks on the disk storage medium, and subsequently seek in sequence odd-numbered tracks on the disk storage medium. Furthermore, the seek is controlled so as to initially seek in sequence odd-numbered tracks on the disk storage medium, and subsequently seek in sequence even-numbered tracks on the disk storage medium.

A data read/write method according to the present invention is the method for reading/writing sequential data from/into sectors of concentric and circular tracks on a disk storage medium. The method includes the step of reading/writing the sequential data from/into two of the tracks by radially moving the magnetic head in such a way that a distance between the two of the tracks is equal to or greater than twice as long as a track interval.

A data assignment method according to the present invention is the method for assigning sequential data to sectors of concentric and circular tracks on a disk storage medium. The method includes the steps of assigning, at first, sequential data to sectors on a first track; and assigning, then, sequential data to sectors on a second track, at least one track being disposed between the first track and the second track, if the sectors of the first track are full.

A disk storage medium according to the present invention includes a plurality of tracks, each of which has a plurality of sequential logical address blocks. The plurality of tracks includes a first track having a first sequential logical address block; a second track having a second sequential logical address block which follows the first sequential logical address block; and at least one track disposed between the first track and the second track. Thus, a disk storage medium according to the present invention includes tracks each having n logical block addresses (LBAs), where n is an arbitrary positive integer. The tracks includes a first track having k-th through (k+n-1)-th logical block addresses, where k is an arbitrary positive integer; a second track having (k+n)-th through (k+2n-1)-th logical block addresses; and at least one track disposed between the first track and the second track.

It is an object of the present invention to provide a disk drive, a disk control method, a data read/write method, a data assignment method and a disk storage medium which prevent a non-linear movement of the magnetic head and an increase of friction of the bearing even if the track width becomes narrower in order to increase the capacity, thus enabling an improved accuracy of positioning by the servo operation.

Other objects, features, and advantages of the present invention will be apparent from the accompanying drawings and from the detailed description below.

BRIEF DESCRIPTION OF THE DRAWINGS

The present invention is illustrated by way of example and not limitation in the figures of the accompanying drawings, in which like references indicate similar elements, and in which.

DESCRIPTION OF THE PREFERRED EMBODIMENTS

A disk unit, a disk control method, a data read/write method, a data assignment method and a disk storage medium according to the present invention are applicable to a compact HDD.

Figure 1:
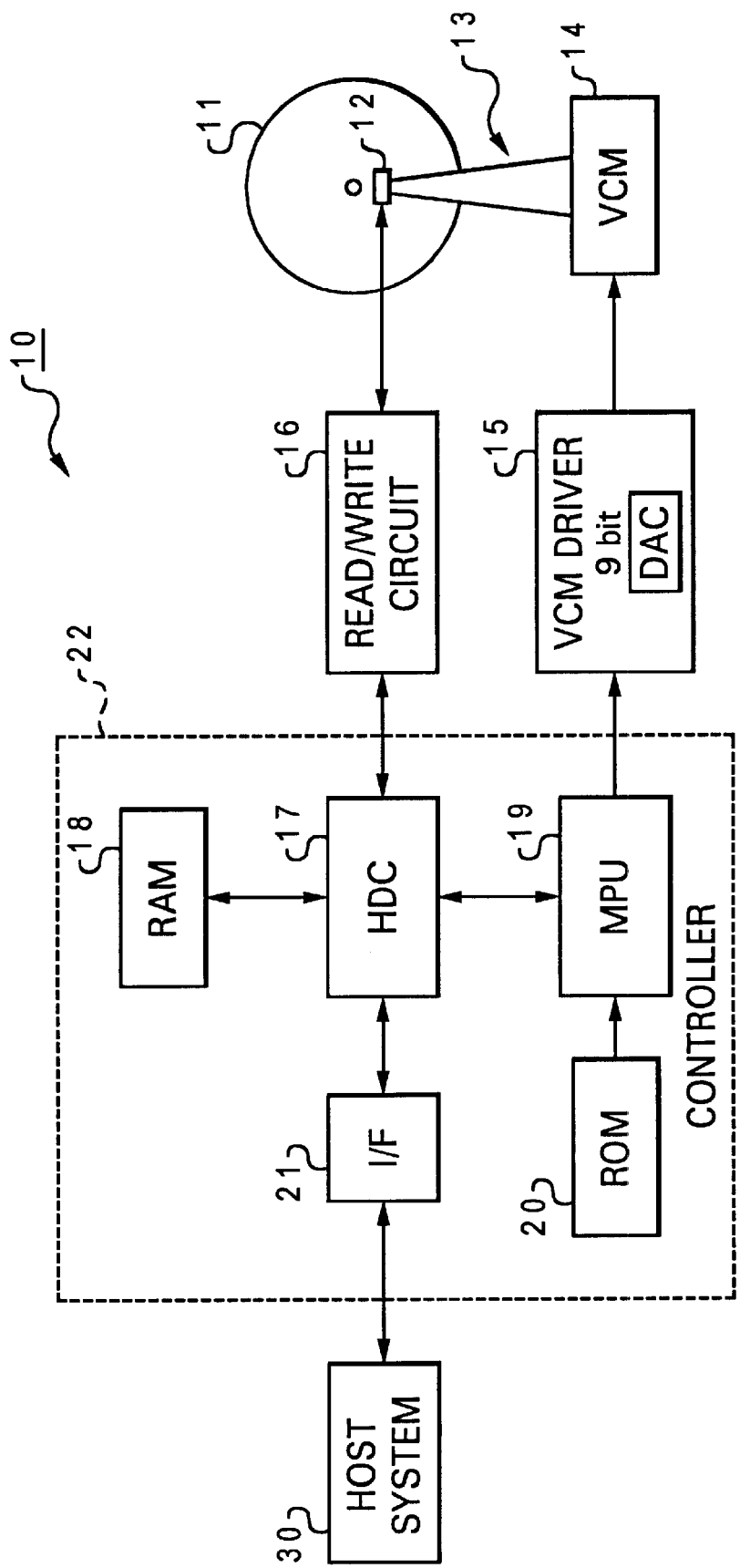
FIG. 1 is a block diagram showing a disk drive unit according to an embodiment of the present invention.

FIG. 1 is a block diagram showing a disk drive unit according to an embodiment of the present invention.

Referring to FIG. 1, a magnetic disk unit (HDD) 10 as a disk drive unit has a magnetic disk 11 (disk storage medium) as a data record medium, and a magnetic head 12 for reading/writing data from/into the magnetic disk 11. The HDD 10 also has an actuator mechanism 13 for moving a slider which carries the magnetic head 12 to a particular position over a surface of the magnetic disk 11, a voice coil motor (VCM) 14 for causing an access arm of the actuator mechanism 13 to swing, and a VCM driver 15 which includes a spindle motor for causing the magnetic disk 11 to rotate and drives the VCM 14. The HDD 10 further has a read/write circuit 16 for controlling a data read/write operation, which contains a module including an amplifier circuit for a detection signal, a waveform shaper, an analog-to-digital converter (ADC), a digital-to-analog converter (DAC). The HDD 10 also has a hard disk controller (HDC) 17 for controlling the data read/write operation from/into the magnetic disk 11, a RAM 18 for temporarily storing data fed thereto and caching data to be recorded into the magnetic disk 11 and data reproduced from the magnetic disk 11, an MPU 19 for controlling an operation of the entire HDD inclusive of the HDC 17, a ROM 20 for storing microprograms and data to operate the MPU 19, and an interface (I/F) 21 which is connected to an external host system 30 through a bidirectional line.

The VCM driver 15 includes a 9-bit digital-to-analog converter (DAC) which converts a digital control signal from the MPU 19 into an analog control signal and transmits it to the VCM 14.

The HDC 17, the RAM 18 and the MPU 19 are connected each other through a data bus. Further, the HDC 17 is connected with the MPU 19 through a control bus, and is connected with the host system 30 located outside the HDD through the I/F 21.

The magnetic disk 11 may be of an embedded servo (i.e., a sector servo) type in which a disk surface has concentric and circular tracks each containing both data regions in which data is recorded and servo regions in which servo data is previously recorded, or of a servo surface servo type in which one of the disk surfaces of the magnetic disk is for servo use only, while only data is recorded on the other disk surface.

As will be described more specifically later, the magnetic disk 11 according to this embodiment has a plurality of concentric and circular data tracks, each of which includes n LBAs, where n represents an arbitrary positive integer. The magnetic disk 11 is formatted so as to include a first track having a predetermined number of first sequential LBAs, a second track having a predetermined number of second sequential LBAs which immediately follow the first sequential LBAs, and at least one track disposed between the first track and the second track.

The HDC 17, the RAM 18, the MPU 19, the ROM 20 and the I/F 21 as a whole operate to control the operation of the entire HDD, and constitutes a controller 22 which controls a data input from or a data output to the host system 30 as an external system connected through the I/F 21.

The controller 22 includes the MPU 19 which executes a control program, a memory which stores data such as the control program and a defect map indicating locations of defective sectors, and other components. The memory includes the RAM 18 and the ROM 20, and the control program is stored in the ROM 20, for example. While data stored in the ROM 20 can be read at a high speed, there is a limitation on the capacity of the ROM 20 because of packaging technology and cost reduction. Accordingly, a portion of the control program which cannot be stored in the ROM 20 may be saved in a given region of the magnetic disk 11, and may be read out from the magnetic disk 11 and written into the RAM 18 upon power on reset (POR) for execution of the control program. Further, the RAM 18 has a function of a cache memory having a storage capacity on the order of data of several hundreds of record units (i.e., sectors) on the magnetic disk, for example, 128 KB (256 blocks).

The controller 22 controls the operation of the entire HDD by executing the control program (microprogram), controlling a read/write operation with respect to the magnetic disk 11 on the basis of commands and data which are fed from the host system 30 through the I/F 21.

The MPU 19 of the controller 22 is capable of executing a plurality of processes in parallel. One of these processes relates to a control over input/output of commands and data with respect to the host system 30, another is a write cache process in which the write data saved in a buffer (RAM 18) is written into the magnetic disk 11, and a further one relates to a seek control in which the magnetic head is brought substantially radially over the magnetic disk 11 to be positioned on a particular one of the tracks. In addition, the MPU 19 is capable of executing processes such as arithmetic operations for the servo control, an error recovery process and the like in parallel.

In particular, the controller 22 controls the seek in such a way that, when reading/writing sequential LBA sectors from/into two of the tracks by radially moving the magnetic head, a distance between the two of the tracks is equal to or greater than twice as long as a track interval.

The operation of the HDD 10 constructed in the manner mentioned above will be described below. First, a basic concept of the present invention will be described. In the conventional disk drive units, however, there is a continuing demand for narrower track widths (i.e., high TPI (track per inch)), which causes the following problems.

Specifically, in order to increase the capacity of a magnetic disk, a disk drive unit requires a narrower width of each track located on the magnetic disk. When the one-track seek is performed by the magnetic head in the disk drive unit, bearings which support the magnetic head fail to rotate satisfactorily, resulting in a non-linear movement of the magnetic head. In addition, as one-track seeks are repeated, there occurs an increase in friction, resulting in a failure of a servo system to maintain the magnetic head on a target track. By way of example, when the track width is reduced to the order of 1.8 micrometers or less, repetition of the one-track seeks causes such an increase in friction which results in a failure of the servo system to function properly to maintain the magnetic head on the target track.

Figure 7:
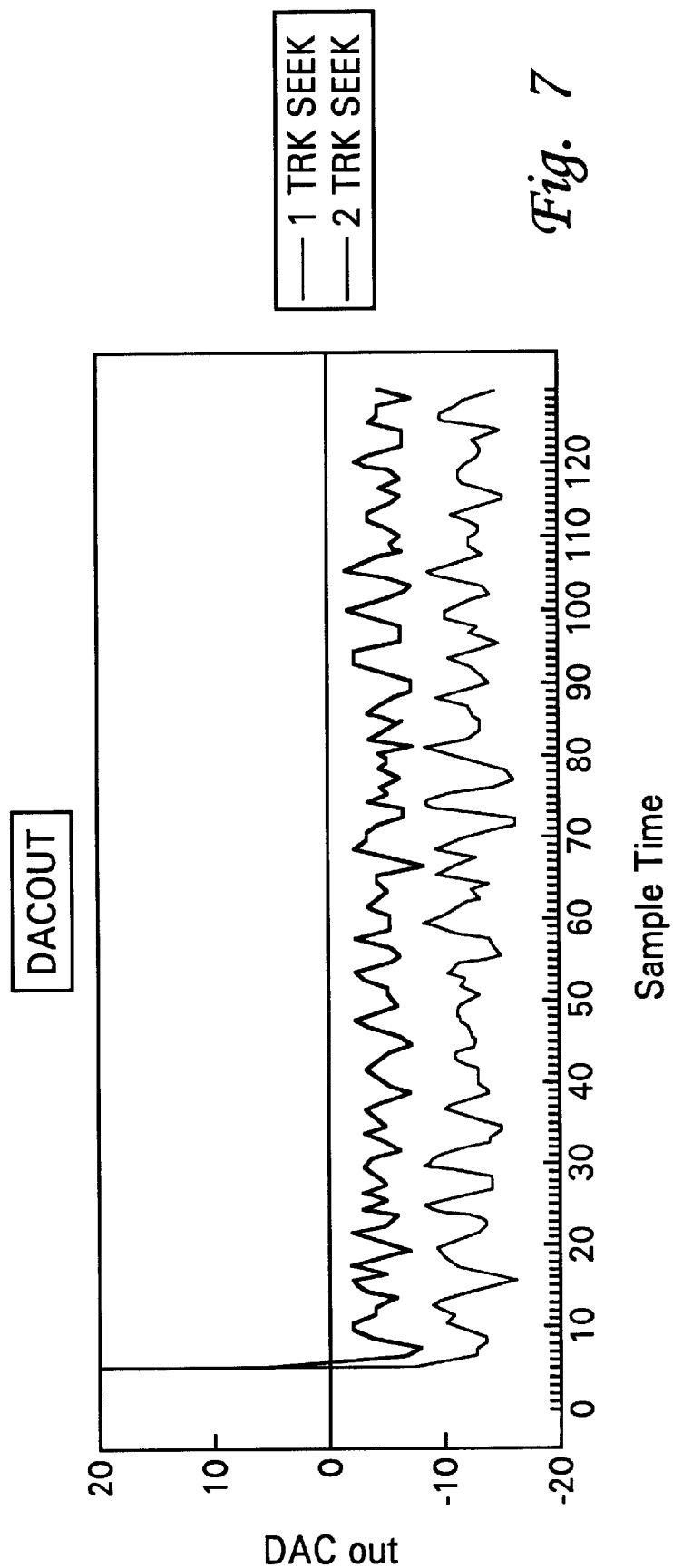
FIG. 7 is a diagram showing changes occurring in the magnitude of a current DACout generated across the VCM coil of the conventional disk drive unit after the VCM coil seeks the track and stops moving.

FIG. 7 is a diagram showing changes in the magnitude of a current DACout (1 DACout=195.3 microampere) which is generated across a VCM coil when the magnetic head stops its movement after a track seek. In FIG. 7, a thin solid line represents a current DACout when the magnetic head stops its movement by the friction after a one-track seek while the thicker solid line represents a current DACout when the magnetic head stops its movement by the friction after a two-track seek.

It is seen from FIG. 7 that a DC component in the current DACout during the one-track seek is different from that during the two-rack seek. The DC component is greater during the one-track seek (the thin solid line) in which the magnetic head moves at a minute distance. It is considered that this is attributable to a departure of behavior of the bearings from an ideal movement. Thus, the friction which influences the current DACout varies according to a type of the track seek, causing a disadvantage that the centering of the positioning is degraded.

Thus, a distance of movement of the magnetic head by the one-rack seek is so small (or is equal to a track interval which is a distance between respective center lines of two adjacent tracks) that the bearings for supporting the actuator arm holding the magnetic head cannot rotate satisfactorily, resulting in a non-linear movement of the magnetic head. This is because the non-linear movement increases friction of the bearing and a servo operation for maintaining the magnetic head on a particular track cannot function precisely.

Accordingly, in accordance with the present invention, the physical sectors are assigned LBA in such a way that a possibility for the one-track seek is minimized or eliminated during a sequential accessing.

Specifically, the HDD 10 is constructed so as to do a two-track seek, in which the magnetic disk moves twice as long as a track interval, when an LBA sequence results in a track change taking place, thus increasing the distance of movement of the magnetic head during the sequential accessing.

Figure 2:
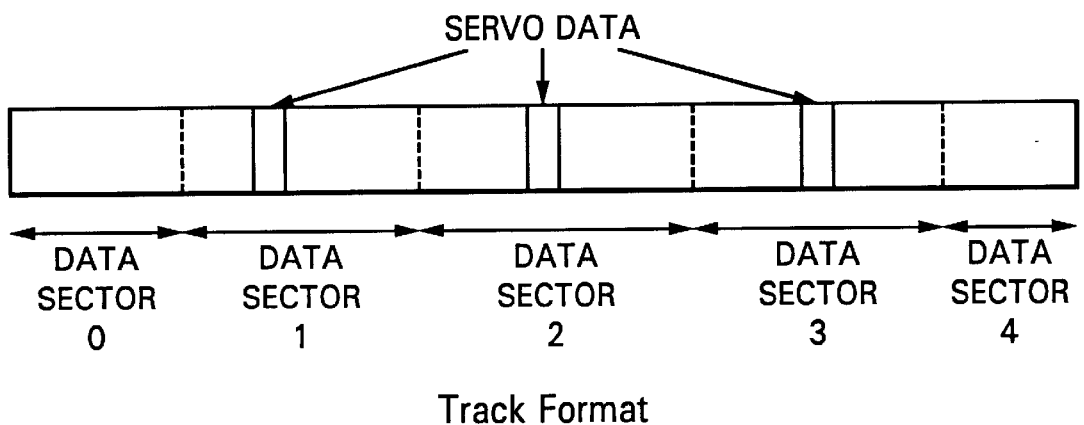
FIG. 2 is a schematic diagram showing a format of one track used in the above-mentioned disk drive unit.

FIG. 2 is a diagram illustrating a track format used in the HDD 10 as a typical track format. Referring to FIG. 2, servo data are allocated at an equal intervals on one track while user data sectors are allocated to the remaining regions of the track. Thousands of such tracks are provided on a single disk surface, as exemplified by the data tracks n, n+1, n+2, . . . , as shown in FIG. 5 described above.

Figure 3:
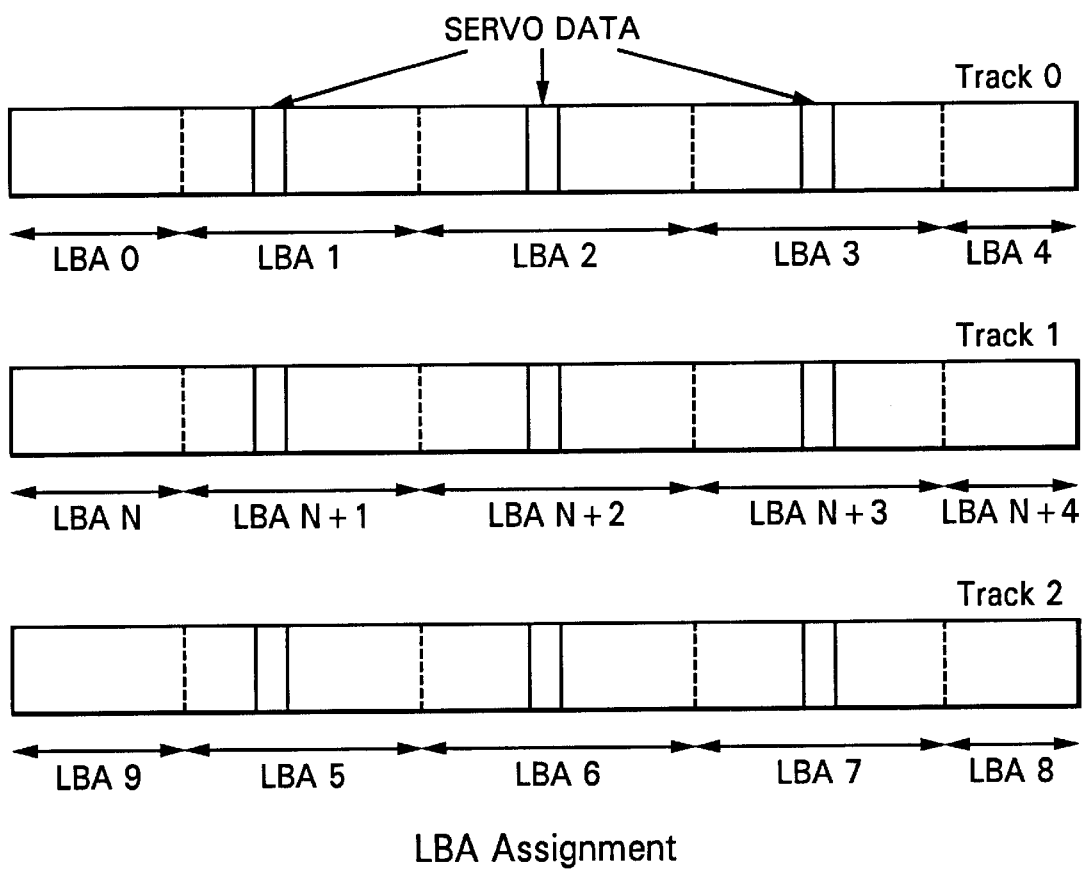
FIG. 3 is a schematic diagram showing an LBA assignment in the above-mentioned disk drive unit.
Figure 5:
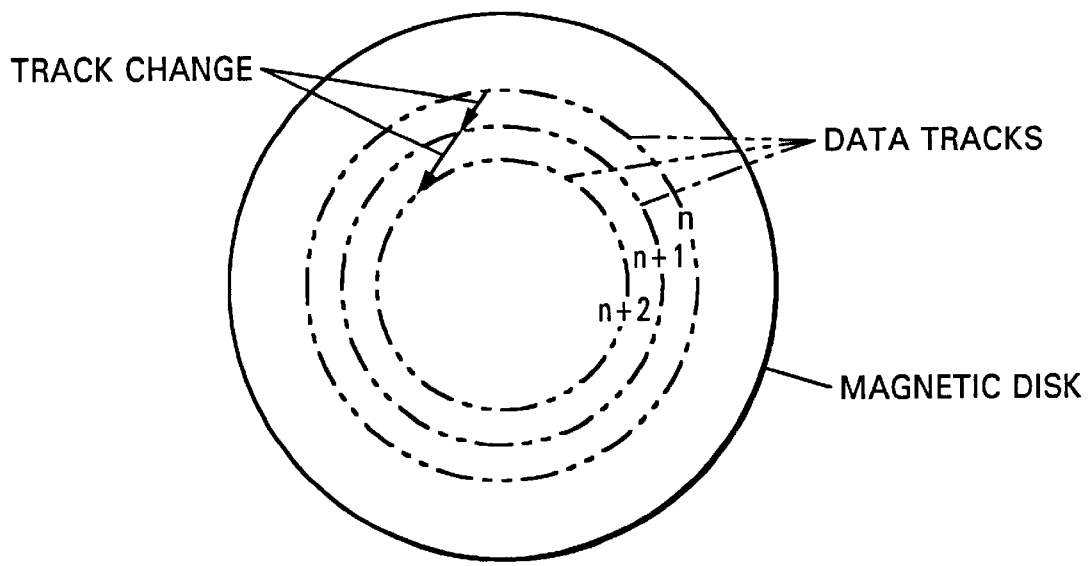
FIG. 5 is a schematic diagram illustrating a track change on a single surface of the magnetic disk in a conventional disk drive unit.

FIG. 3 is a diagram schematically showing an LBA assignment, which may be applied to the magnetic disk having the data tracks n, n+1, n+2, . . . , as shown in FIG. 5 described above. In this data assignment example, user data (LBA 0) are assigned first to an outermost track of the magnetic disk.

Referring to FIG. 3, in the HDD 10 of this embodiment, the LBA assignment begins with the track 0, and an LBA (LBA 5 in FIG. 3) which immediately follows the last LBA (LBA 4 in FIG. 3) on the track 0 is assigned to the track 2, which is a next even-numbered track. Subsequently, sequential LBAs are assigned to the even-numbered tracks (tracks 6, 8, 10, . . . , which are not shown in the figures). When the LBA assignment to the innermost even-numbered track is completed, the subsequent LBA assignment begins with the track 1 as the odd-numbered track.

In other words, in the HDD according to this embodiment which executes the two-track seek, the sequential LBAs are first assigned to the even-numbered tracks, and subsequently assigned to the odd-numbered tracks. Referring to FIG. 3, LBA 0 through LBA 4 as the sequential LBAs are assigned to the track 0, and subsequent LBA 5 through LBA 9 as the sequential LBAs are assigned to the track 2 by skipping over the track 1. In a similar manner, the sequential LBAs are assigned to the even-numbered tracks until LBA N–1 is assigned to the innermost even-numbered track. When the LBA assignment to the even-numbered tracks is completed, the LBA assignment to the odd-numbered track 1 is executed so as to assign LBA N through LBA N+4 to this track.

Alternatively, upon completion of the LBA assignment to the even-numbered tracks, the next odd-numbered track which is chosen for the assignment may be one located close to the last even-numbered track, subsequently wrapping around toward the track 1. In addition, the LBA 5 is circumferentially displaced in order to minimize the rotational delay time when the magnetic head moves from the track 0 to the track 2. Thus in this example, after the drive reads LBA 4, the drive has a delay time, while LBA 9 is rotating around, before LBA 5 comes around on track 2.

In this manner, a distance equal to or greater than twice as long as a track interval (namely, the distance of two-track seek) is secured even for a sequential access. This suppresses the increase in friction which otherwise results from a succession of one-track seeks. This benefit will be even more important as the track width is narrowed. It should be noted that it is not necessary to eliminate all of the one-track seeks to obtain the benefits of the invention.

Next, the operation of the HDD 10 will be described in detail with reference to the flow chart on the basis of the above-mentioned basic concept.

Figure 4:
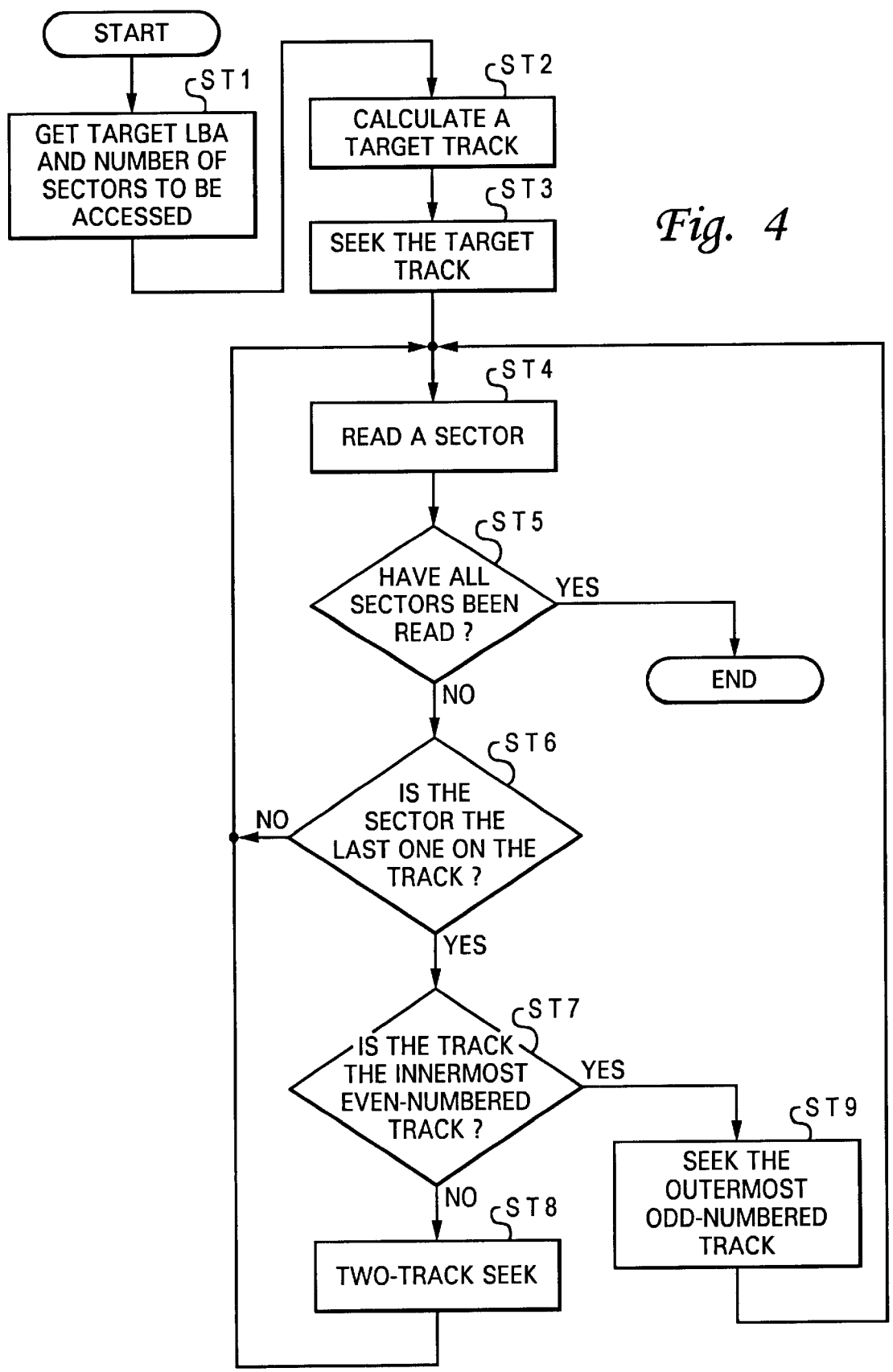
FIG. 4 is a flowchart showing an algorithm for the seek in the above-mentioned disk drive unit.

FIG. 4 is a flowchart showing an algorithm of the seek, and processes in this flow is executed by the MPU 19. In FIG. 4, ST followed by a numeral denotes a step of this flow.

Initially, at a step ST1, the MPU 19 obtains a target LBA and a number of sectors to be accessed from the host system. At a next step ST2, the MPU 19 calculates a cylinder head and a target track physically corresponding to the target LBA, and at a step ST3, a seek to the calculated target track is executed.

Subsequently, at step ST4, one sector is read, and at step ST5, the MPU 19 judges whether or not all the sectors to be accessed have been read. When all the sectors have been read, the MPU 19 stops the seek. When all the sectors have not been read yet, in order to process the data at the remaining sectors, at step ST6, the MPU 19 judges whether or not the present sector is the last one on the track. If the sector is not the last one on the track, the process returns to the step ST4 where reading from the sector is continued. If the sector is the last one on the track, the MPU 19 judges at a step ST7 whether or not this track is an innermost even-numbered track having an innermost diameter (ID).

At the step ST7, if the track is not the innermost even-numbered track, the two-track seek mentioned previously in connection with FIG. 3 is executed to return to the step ST4 where the reading of a sector is continued. At the step ST7, if the track is the innermost even-numbered track, a decision is rendered that the reading from the even-numbered tracks is completed, and the process proceeds to a step ST9. At the step ST9, a seek to an outermost odd-numbered track having the outermost diameter (OD), namely, track 1 is executed, and the process then returns to the step ST4 to continue the reading from a sector.

As has been described above, the HDD 10 according to this embodiment has the magnetic disk 11, and the controller 22 which includes the HDC 17, the RAM 18, the MPU 19 controlling the operation of the HDD inclusive of the control over the HDC 17, the ROM 20 which stores microprograms and the other data, and the I/F 21 used for connection with the external host system 30. An LBA assignment on the magnetic disk 11 is made such that when one track contains n LBAs, there is at least one track between the first track which contains a given number of first sequential LBAs and the second track which contains a given number of second sequential LBAs which immediately follow the given number of first sequential LBAs on the first track. The controller 22 controls the seek in such a way that when reading/writing sequential data from/into two of the tracks on the disk storage medium by radially moving the magnetic head, a distance between the two of tracks is equal to or greater than twice as long as a track interval. In this manner, a non-linear movement or an increase in the friction of the bearing can be prevented even if the track width is narrowed for purpose of providing a higher capacity or a higher TPI, thus allowing the servo positioning accuracy to be improved.

Further, in this embodiment, the seek is controlled such that the sequential data are first read/written from/into the even-numbered tracks, and after all the even-numbered tracks have been read/written, the sequential data are read/written from/into the odd-numbered tracks. Accordingly, a very simple control may be used to prevent an increase in the friction of the bearing, thus improving the servo positioning accuracy.

Furthermore, this embodiment can be implemented without requiring additional circuitry. In addition, there is no change in the external appearance in respect of the arrangement and storage medium. Consequently, an excellent effect is achieved that the embodiment can be easily and inexpensively carried out without incurring the need for a change of host system operation.

While this embodiment illustrates the application of the present invention to the HDD, it should be understood that the present invention is not limited thereto, but is also applicable to any type of the disk drive unit. For example, the present invention can be applied to an external memory other than the HDD such as magnet-optical disk or the like, with a similar effect as mentioned above in connection with the embodiment.

This embodiment described an example of the seek to every other track, in which the seeks to odd-numbered tracks are executed subsequent to the seeks to even-numbered tracks. However, the sequence of the seeks to odd-numbered tracks and the seeks to even-numbered tracks may be reversed. Further, the order of track seeks may not be every other track. In accordance with the present invention when reading/writing sequential data from/into two of the tracks by radially moving the magnetic head, at least one track is disposed between two tracks containing sequential data.

As regards the data assignment method, sequential data is assigned to every other track in this embodiment, but sequential data may be assigned to every third track or a further spaced track with similar effect. Alternatively, it is possible that sequential data to be stored in the first to tenth ten tracks are assigned to every other track, and sequential data to be stored in the eleventh track may be spaced by two or more tracks, still achieving the similar effect. The sequential data may be stored in any other manner in accordance with the basic concept of the present invention.

Figure 6:
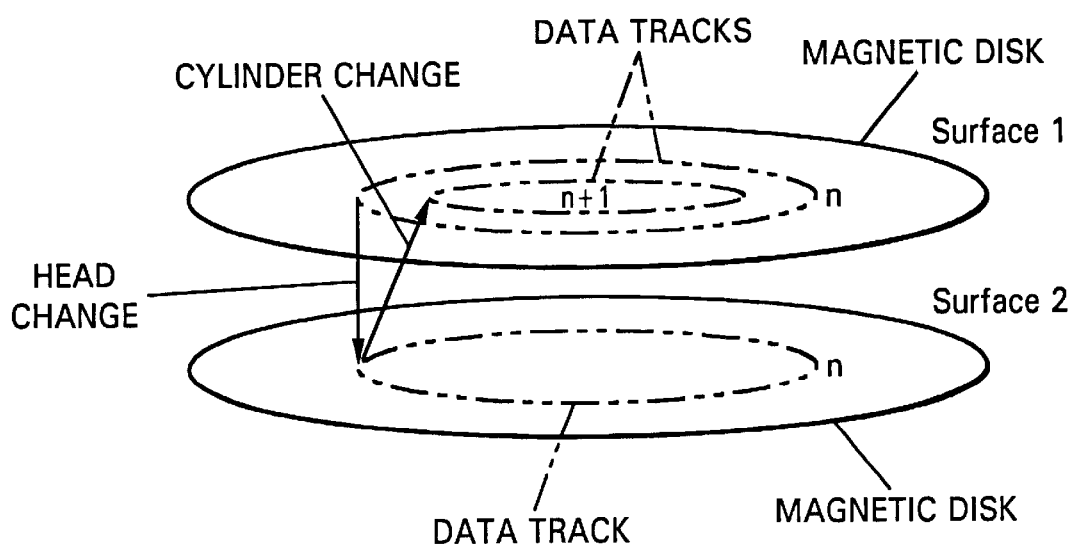
FIG. 6 is a schematic diagram illustrating a track change on a plurality of surfaces of the magnetic disks in another conventional disk drive.

This embodiment has been described above in terms of an example illustrated in FIG. 5, but can be used with an arrangement as illustrated in FIG. 6, by employing a similar change for the cylinder change, again achieving the similar effect.

It should be understood that the types of the HDC, the memories, the MPU and the like, which constitute the disk drive as well as specific numbers mentioned above, are not limited to those given in the above-described embodiment.

Effect of the Invention

Due to the disk drive, the disk control method, the data read/write method, the data assignment method and the disk storage medium according to the present invention, when reading/writing sequential data from/into two of the tracks of the disk storage medium by radially moving the magnetic head, a distance between the two of the tracks is equal to or greater than twice as long as a track interval. In this manner, a non-linear movement or an increase in the friction of the bearing can be prevented even if the track width is narrowed for purpose of providing a higher capacity, thus allowing the servo positioning accuracy to be improved.

While the preferred embodiments of the present invention have been illustrated in detail, it should be apparent that modifications and adaptations to those embodiments may occur to one skilled in the art without departing from the scope of the present invention as set forth in the following claims.

We claim:

1. A disk drive comprising:

a disk storage medium having concentric tracks;

means for seeking which moves a magnetic head radially over the disk storage medium to be positioned over a selected track; and seek control means which assigns logical addresses to physical tracks in such a way that each and every sequential logical addresses spanning two tracks are assigned to tracks which are separated by a distance equal to or greater than twice as long as a track interval.

2. The disk drive of claim 1, wherein the seek control means further comprises means for assigning k-th through (k+n−1)-th logical block addresses to a first track and (k+n)-th through (k+2n−1)-th logical block address to a second track which is separated from the first track by at least one additional track disposed between the first track and the second track.

3. The disk drive of claim 2 further comprising means for rotationally offsetting the (k+n)-th logical block address from the (k+n−1)-th logical block address.

4. The disk drive according to claim 1, further comprising:

logic for writing data to said sequential logical addresses according to the physical tracks to which said logical addresses are assigned; and logic for reading data from said sequential logical addresses according to the physical tracks to which said logical addresses are assigned.

5. The disk drive of claim 1, further comprising means for applying an interval measured by number of tracks to subsequent read and write operations with said disk storage medium.

6. A disk control method for controlling a seek in which a magnetic head is radially positioned on one of a plurality of tracks of a disk storage medium, the method comprising the steps of:

mapping n sequential logical addresses on a first track until the first track is fully assigned;

selecting a second track which is located a distance from the first track which is equal to or greater than twice as long as a track interval; and mapping an (n+1)-th sequential logical address to a selected position on the second track;

wherein each and every sequential logical addresses spanning two tracks is separated from each other at a distance which is equal to or greater than twice as long as a track interval.

7. A disk control method according to claim 6 further comprising the step of selecting the selected position on the second track to be rotationally offset from the n-th logical address wherein a delay time is provided between the n-th logical address and the (n+1)-th logical address.

8. A disk control method according to claim 6, wherein the step of selecting a second track selects an odd numbered track when the first track is an odd numbered track.

9. A disk control method according to claim 6, further comprising initially seeking even-numbered tracks in sequence on the disk storage medium, and subsequently seeking odd-numbered tracks in sequence on the disk storage medium.

10. The disk control method of claim 9, wherein said initially seeking even-numbered tracks and subsequently seeking odd-numbered tracks comprises:

mapping sequential logical addresses on even-numbered tracks beginning from an innermost even-numbered track to an outermost even-numbered track; and completing a mapping of said sequential logical addresses on odd-numbered tracks beginning from an innermost odd-numbered track to an outermost odd-numbered track.

11. A disk control method according to claim 6, further comprising initially seeking odd-numbered tracks in sequence on the disk storage medium, and subsequently seeking even-numbered tracks in sequence on the disk storage medium.

12. The disk control method of claim 11, wherein said initially seeking odd-numbered tracks and subsequently seeking even-numbered tracks comprises:

mapping sequential logical addresses on odd-numbered tracks beginning from an innermost odd-numbered track to an outermost odd-numbered track; and completing a mapping of said sequential logical addresses on even-numbered tracks beginning from an innermost even-numbered track to an outermost odd-numbered track.

13. The disk control method of claim 6, further comprising selecting an interval, measure by number of tracks, for assigning said each and every sequential logical addresses spanning two tracks.

14. A data read/write method for reading data from sectors on tracks on a disk storage medium using a read head, wherein said data is written on said medium having sequential data spanning a first and second track separated by at least a third track, the method comprising the steps of:

reading an n-th logical address from said first track; and radially moving the read head to said second track which is separated from the first track by at least a third track, wherein a read operation from one track to a next track on which sequentially addressed data is located always requires moving said read head a distance of at least two tracks such that said read head always skips over at least one adjacent track to get to a next sequential data; and reading said (n+1)-th logical address from the second track.

15. The data read/write method of claim 14, wherein said reading an (n+1)-th logical address further comprises adjusting a location of said read head on said storage medium by a distance equal to a rotational offset between a position of said n-th logical address and said (n+1)-th logical address.

16. The data read/write method of claim 15, further comprising:

detecting an event at which a track change is required; and determining a circumferential displacement that minimizes a rotational delay time when said magnetic head moves from the first track to the second track.

17. A data assignment method for assigning logical addresses to sectors on tracks on a disk storage medium, the method comprising the steps of:

assigning n sequential logical addresses to n sectors on a first track; and assigning an (n+1)-th and (n+2)-th logical addresses to sectors of a second track, at least one track being disposed between the first track and the second track, wherein no two sequential logical addresses spanning two tracks are assigned to adjacent tracks of said disk storage medium.

18. A data assignment method according to claim 17, wherein the (n+1)-th logical address is rotationally offset from the n-th logical address so that there is a delay between the n-th logical address and the (n+1)-th logical address to allow a seek to be performed.

* * * * *